United States Patent
Suekane et al.

(10) Patent No.: US 7,166,374 B2
(45) Date of Patent: *Jan. 23, 2007

(54) MAGNETIC RECORDING MEDIUM

(75) Inventors: Michinobu Suekane, Yonezawa (JP); Makoto Imakawa, Yonezawa (JP); Takehiko Hiruma, Yonezawa (JP)

(73) Assignee: Komag, Inc., San Jose, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 10/808,089

(22) Filed: Mar. 23, 2004

(65) Prior Publication Data

US 2004/0180240 A1    Sep. 16, 2004

Related U.S. Application Data

(63) Continuation of application No. 09/895,679, filed on Jun. 29, 2001, now Pat. No. 6,743,528, which is a continuation of application No. 09/265,597, filed on Mar. 10, 1999, now Pat. No. 6,261,681.

(30) Foreign Application Priority Data

Mar. 20, 1998    (JP)    ............................ 10-072673

(51) Int. Cl.
G11B 5/66    (2006.01)
G11B 5/70    (2006.01)

(52) U.S. Cl. .................................... 428/828
(58) Field of Classification Search ........ 428/694 TM, 428/611, 668, 336, 828, 828.1
See application file for complete search history.

(56) References Cited

U.S. PATENT DOCUMENTS

| | | | |
|---|---|---|---|
| 5,051,288 A | 9/1991 | Ahlert et al. | 428/64 |
| 5,147,732 A | 9/1992 | Shiroishi et al. | 428/668 |
| 5,580,667 A | 12/1996 | Lal et al. | 428/610 |
| 5,607,740 A | 3/1997 | Noda | 428/65.3 |
| 5,688,380 A | 11/1997 | Koike et al. | 204/192.2 |
| 5,693,426 A | 12/1997 | Lee et al. | 428/611 |
| 5,701,223 A | 12/1997 | Fontana, Jr. et al. | 360/113 |
| 5,756,202 A | 5/1998 | Van Kestersen et al. | 428/332 |
| 5,834,111 A | 11/1998 | Lal et al. | 428/332 |
| 5,843,569 A | 12/1998 | Kaitsu et al. | 428/323 |
| 5,846,648 A | 12/1998 | Chen et al. | 428/332 |
| 5,851,643 A | 12/1998 | Honda et al. | 428/212 |

(Continued)

FOREIGN PATENT DOCUMENTS

DE    19700596    7/1997

(Continued)

OTHER PUBLICATIONS

H.J. Richter et al., "Dynamic Coercivity Effects In Thin Film Media", IEEE Transactions on Magnetics, vol. 34, No. 4, Jul. 1998 pp. 1540-1542.

(Continued)

*Primary Examiner*—Holly Rickman

(57) ABSTRACT

A magnetic recording medium comprising a non-ferromagnetic substrate and a magnetic recording film formed on the substrate with an underlayer interposed therebetween, wherein the magnetic recording film comprises a plurality of magnetic layers and an interlayer made of a material having a B2 crystal structure or an interlayer made of Ru, disposed between the adjacent magnetic layers.

15 Claims, 4 Drawing Sheets

U.S. PATENT DOCUMENTS

| | | | |
|---|---|---|---|
| 5,851,656 A | 12/1998 | Ohkubo | 428/332 |
| 5,898,549 A | 4/1999 | Gill | 360/113 |
| 6,077,586 A | 6/2000 | Bian et al. | 428/65.3 |
| 6,143,388 A | 11/2000 | Bian et al. | 428/65.3 |
| 6,261,681 B1 | 7/2001 | Suekane et al. | 428/332 |
| 6,280,813 B1 | 8/2001 | Carey et al. | 428/65.3 |
| 6,743,528 B2 * | 6/2004 | Suekane et al. | 428/694 TM |

FOREIGN PATENT DOCUMENTS

| | | |
|---|---|---|
| EP | 0 704 839 A1 | 4/1996 |
| EP | 0 892 393 A1 | 1/1999 |
| EP | 1 059 629 A2 | 12/2000 |
| EP | 1 059 629 A3 | 3/2002 |
| GB | 2355018 A | 4/2001 |
| JP | 63-146219 | 6/1988 |
| JP | 6-349047 | 12/1994 |
| JP | 7-134820 | 5/1995 |
| JP | 7-176027 | 7/1995 |
| JP | 7-121863 | 12/1995 |
| JP | 8-129738 | 5/1996 |
| JP | 9-147349 | 6/1997 |
| JP | 10-40258 | 2/1998 |
| JP | 10-092637 | 4/1998 |
| JP | 10-289434 | 10/1998 |
| WO | WO 96/24927 | 8/1996 |
| WO | WO 97/34295 | 9/1997 |

OTHER PUBLICATIONS

Pu-Ling Lu et al., "Thermal Instability at 10 Gbit/in$^2$ Magnetic Recording", IEEE Transactions on Magnetics, vol. 30, No. 6, Nov. 1994, pp. 4230-4232.

S.S.P. Parkin, "Systematic Variation in the Strength and Oscillation Period of Indirect Magnetic Exchange Coupling through the 3d, 4d, and 5d Transition Metals", Physical Rev. Letters, Dec. 16, 1991, pp. 3598-3601.

Pu-Ling Lu et al., "High Density Magnetic Recording Media Design and Identification: Susceptibility to Thermal Decay", IEEE Transactions on Magnetics, vol. 31, No. 6, Nov. 1995, pp. 2767-2769.

I. Okamoto et al., "Rigid Disk Medium for 5Gb/in$^2$ Recording", IEEE Intermag 1996 Digest.

Y. Hosoe et al., "Experimental Study of Thermal Decay in High-Density Magnetic Recording Media", IEEE Transactions on Magnetics, vol. 33, No. 5, Sep. 1997, pp. 3028-3030.

Pu-Ling Lu et al., "Magnetic Viscosity in High-Density Recording", J. Appl. Phys. 75(10), May 15, 1994, pp. 5768-5770.

E.N. Abarra et al., "Thermal Stability of Narrow Track Bits in a 5 Gbit/in$^2$ Medium", IEEE Transactions on Magnetics, vol. 33, No. 5, Sep. 1997, pp. 2995-2997.

L. He et al., "High-Speed Switching in Magnetic Recording Media", Journal of Magnetism and Magnetic Materials 155 (1996) 6-12.

Akimoto et al., "Relationship Between Magnetic Circumferential Orientation and Magnetic Thermal Stability, Recording Performance", Journal of Magnetic Society of Japan, vol. 24, No. 4-1, 2000, pp. 176-179.

E.N. Abarra et al., "The Effect of Orientation Ratio on the Dynamic Coercivity of Media for >15 Gbit/in$^2$ Recording", IEEE Transactions on Magnetics, vol. 35, No. 5, Sep. 1999, pp. 2709-2711.

M.N. Baibich et al., "Giant Magnetoresistance of (001)Fe/(001)Cr Magnetic Superlattices", Physical Review Letters, vol. 61, No. 21, Nov. 21, 1998, pp. 2472-2475.

K. Meguro et al., "Spin-Valve Films Using Synthetic Ferrimagnetis for Pinned Layer", Intermag. Conf. May 18-19, 1999, p. BR-08.

K. Meguro et al., "Spin-Valve Films Using Synthetic Ferrimagnets for Pinned Layer", IEEE Transactions on Magnetics, vol. 35, No. 5, Sep. 1999, pp. 2925-2927.

H. Akimoto et al., "Magnetic Relaxation in Thin Film Media as a Function of Orientation Ratio", Journal of Magnetism and Magnetic Materials 193 (1999) 240-244.

Parkin et al., "Oscillations in Exchange Coupling and Magnetoresistance in Metallic Superlattice Structures: Co/Ru, Co/Cr, and Fe/Cr", Phys. Rev. Letters, vol. 64, No. 19, May 7, 1990, pp. 2304-2307.

E.S. Murdock et al., "Noise Properties of Multilayered Co-alloy Magnetic Recording Media", IEEE Transactions on Magnetics, vol. 26, No. 5, Sep. 1990, pp. 2700-2705.

Li-Lien Lee et al., "NiAl Underlayers for CoCrTa Magnetic Thin Films", IEEE Transactions on Magnetics, vol. 30, No. 6, Nov. 1994, pp. 3951-3953.

* cited by examiner

MAGNETIC RECORDING MEDIUM

This application is a continuation of U.S. patent application Ser. No. 09/895,679, filed Jun. 29, 2001 now U.S. Pat. No. 6,743,528, which is a continuation of U.S. patent application Ser. No. 09/265,597, filed Mar. 10, 1999, now U.S. Pat. No. 6,261,681, which claims priority to Japanese Application Serial No. 10-072673, filed Mar. 20, 1998.

BACKGROUND OF THE INVENTION

1. Field of the Invention

The present invention relates to a magnetic recording medium suitable as a recording medium for a hard disc device.

2. Discussion of Background

In recent years, magnetic recording media have been developed for high density recording. As one of methods for reducing media noises, JP-A-63-146219 or IEEE TRANSACTIONS ON MAGNETICS, 26(5), 2700–2750(1990) discloses that a magnetic recording film is made to have a multilayer structure comprising a plurality of magnetic layers and an interlayer interposed between the adjacent magnetic layers to reduce the magnetic interaction between the adjacent magnetic layers. Further, as a means to obtain a high coercive force for high recording density, it has been reported to employ, as an underlayer, NiAl having B2 crystal structure (IEEE TRANSACTIONS ON MAGNETICS, 30 (6), 3951–3953 (1994). EP0704839A1).

In said JP-A-63-146219, in order to reduce noises, an $Al_2O_3$, $SiO_2$ or Cr film has been studied as the interlayer to be used for a magnetic recording medium having the above-mentioned magnetic recording film having a multilayer structure, but reduction of noises is still inadequate for an application in future wherein a GMR head will be used. In said EP0704839A1, NiAl has been studied as the underlayer, but no study has been made to let the magnetic recording film have a multilayer structure comprising a plurality of magnetic layers and an interlayer interposed between the adjacent magnetic layers to reduce the magnetic interaction.

SUMMARY OF THE INVENTION

It is an object of the present invention to provide a magnetic recording medium having a medium noise substantially reduced and being capable of high density recording.

The present invention has seen made to accomplish the above object and provides a magnetic recording median comprising a non-ferromagnetic substrate and a magnetic recording film formed on the substrate with an underlayer interposed therebetween, wherein the magnetic recording film comprises a plurality of magnetic layers and an interlayer made of a material having a B2 crystal structure or an interlayer made of Ru, disposed between the adjacent magnetic layers.

DETAILED DESCRIPTION OF THE PREFERRED EMBODIMENTS

Figure 1:
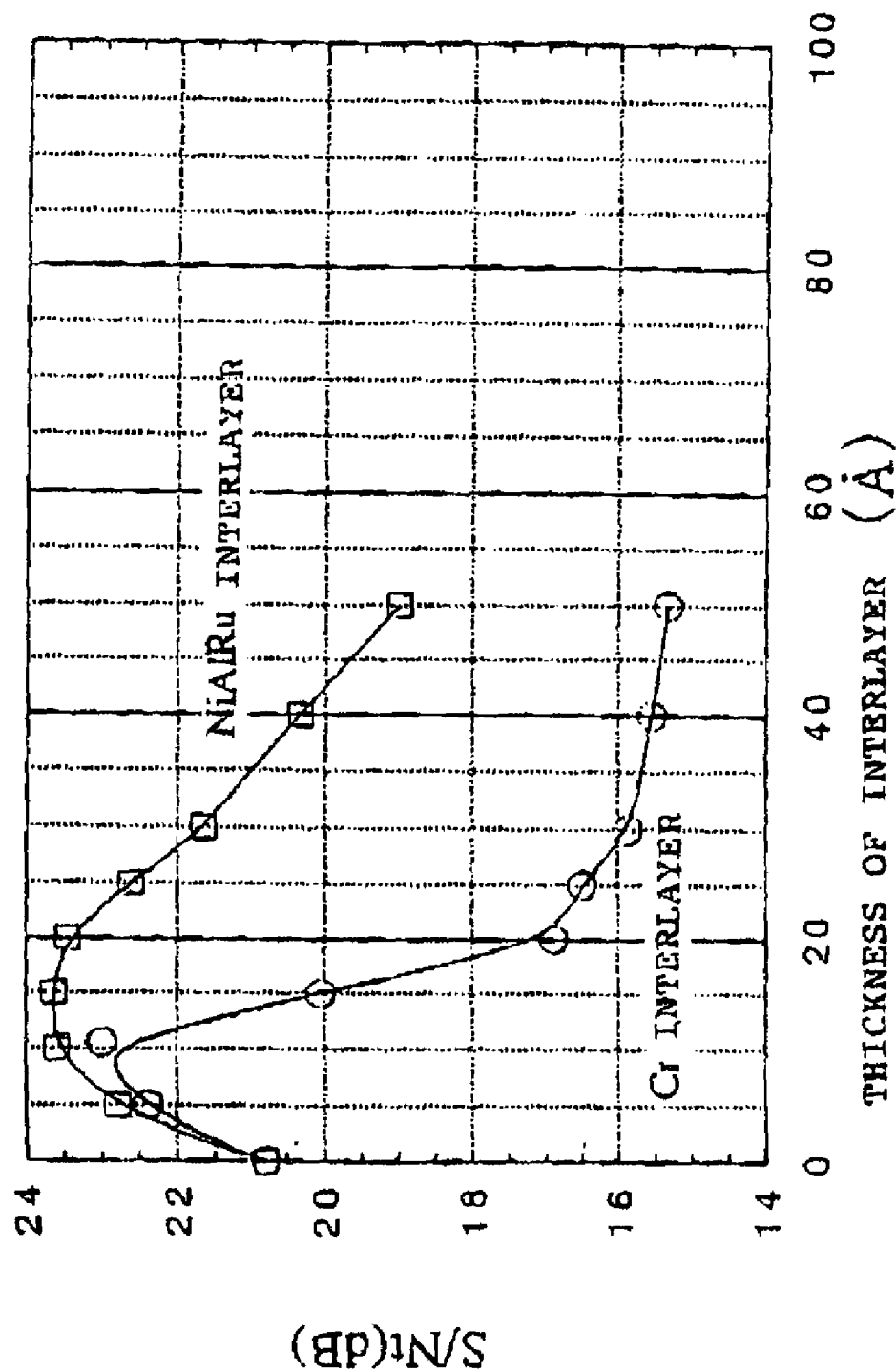
FIG. 1 is a graph showing the relation between the thickness of a NiAlRu interlayer or a Cr interlayer and S/Nt (signal to total noise ratio).

The magnetic recording film in the present invention may take a structure comprising two magnetic layers and an interlayer made of a material having a B2 crystal structure, disposed therebetween, or a structure comprising three or more magnetic layers and an interlayer made of a material having the B2 structure, disposes between the respective adjacent magnetic layers. The material for the interlayer having the above B2 structure may, for example, be one member selected from the group consisting of NiAl, NiAlRu, NiAlNd, NiAlCr, NiAlPt and NiAlPd.

Otherwise, the magnetic recording film in the present invention may take a structure comprising two magnetic layers and an interlayer made of Ru disposed therebetween, or a structure comprising three or more magnetic layers and an interlayer made of Ru disposed between the respective adjacent magnetic layers.

The thickness of the interlayer made of the above-mentioned material having the B2 structure or the interlayer made of Ru, is preferably from 3 Å to 30 Å. If the thickness is less than 3 Å, the effect for reducing the noise tends to be inadequate. On the other hand, if it exceeds about 30 Å, the effect for reducing the noise tends to be hardly observed, and the coercive force tends to substantially decrease, or properties such as the resolution and PW50 (pulse width at 50% of pulse amplitude) required as a magnetic recording medium tend to deteriorate. From these viewpoints, the thickness of the interlayer is preferably from 3 Å to 30 Å, more preferably from 3 Å to 20 Å.

The non-ferromagnetic substrate in the present invention may be selected from substrates made of materials such as an aluminum alloy, glass and crystallized glass.

As the underlayer in the present invention, Cr or a Cr alloy may be employed. The Cr alloy may, for example, be CrMo, CrW, CrTi, CrV or CrMn.

Further, in the present invention, in the case of using a non-ferromagnetic substrate made of the above-mentioned material such as glass or crystallized glass, it is preferred that the magnetic recording medium has a structure wherein a seed layer made of a material having a B2 crystal structure, is formed on the non-ferromagnetic substrate, and the magnetic recording film is formed on the seed layer with the underlayer interposed therebetween.

The material having the B2 structure to be used as he above seed layer, may, for example, be NiAl, NiAlRu, NiAlNd, NiAlCr, NiAlPt or NiAlPd.

By providing such a seed layer on the non-ferromagnetic substrate made of e.g. glass or crystallized glass, the grain growth and the film formation of the Cr or Cr alloy interlayer thereon will be properly controlled, whereby the grain growth and the film formation of the magnetic recording film to be formed on the underlayer will properly be controlled.

The magnetic layers constituting the magnetic recording film in the present invention are preferably made of a Co alloy.

As the magnetic layers in the present invention, magnetic layers made of an alloy comprising Co as the main component and at least Cr and Pt, may be selected. Further, magnetic layers may be selected which are made of an alloy which further contains at least one member selected from the group consisting of Ta, Mo, W, Nb, V, Zr, B and Ti.

Particularly, as the magnetic layers, magnetic layers made of a CoCrPt alloy or a CoCrTaPt alloy, may be selected for use.

On the above-described magnetic recording film, a protective film and a lubricating film may further be provided to obtain the magnetic recording medium of the present invention.

As the protective film, a carbon type material, may, for example, be employed, and as the lubricating film, a perfluoropolyether type lubricant may, for example, be employed.

Now, the present invention will be described in further detail with reference to Examples. However, it should be understood that the present invention is by no means restricted to such specific examples.

EXAMPLE 1

A sputtering chamber was evacuated to a base pressure of $1 \times 10^{-6}$ Torr, and then film forming was carried out as described below in an atmosphere of 5 mTorr at a substrate temperature of 220° C. by applying a substrate bias of −200V.

On a NiP/Al substrate having texture treatment applied thereto, a CrMo layer (thickness: 300 Å) was formed as an underlayer by a magnetron sputtering method using a target made of $Cr_{85}Mo_{15}$. Then, on the CrMo layer, a first magnetic layer made of $Co_{71}Cr_{17}Ta_5Pt_7$ (the amount of the respective components being atomic %) was formed in a thickness of 110 Å by a sputtering method. Then, a NiAlRu interlayer was formed thereon in a thickness within a range of from 5 Å to 70 Å by means of a $Ni_{45}Al_{50}Ru_5$ target. Further, a second magnetic layer made of $Co_{71}Cr_{17}Ta_5Pt_7$ was formed thereon in a thickness of 110 Å by a similar operation. Then, a carbon type protective film and a lubricating film were formed thereon to obtain a test sample of Example 1 of the magnetic recording tedium of the present invention. The above NiAlRu interlayer was identified to be of B2 structure by the X-ray diffraction.

Further, a magnetic recording medium having the same structure as the test sample of Example 1 except that as the interlayer, an interlayer made of Cr was formed in a thickness within a range of from 5 Å to 70 Å, was prepared in the same manner and used as a test sample of Comparative Example 1

FIG. 1 shows a change in the signal to the total noise ratio (S/Nt) when the thickness of the NiAlRu interlayer of Example 1, or the thickness of the Cr interlayer of Comparative Example 1, was changed within a range of from 0 to 50 Å. In the case of the NiAlRu interlayer, it is evident that S/Nt is improved as the thickness increases within a range of from 0 to 30 Å. Further, it is evident that S/Nt is improved as compared with the case of the Cr interlayer.

Figure 2:
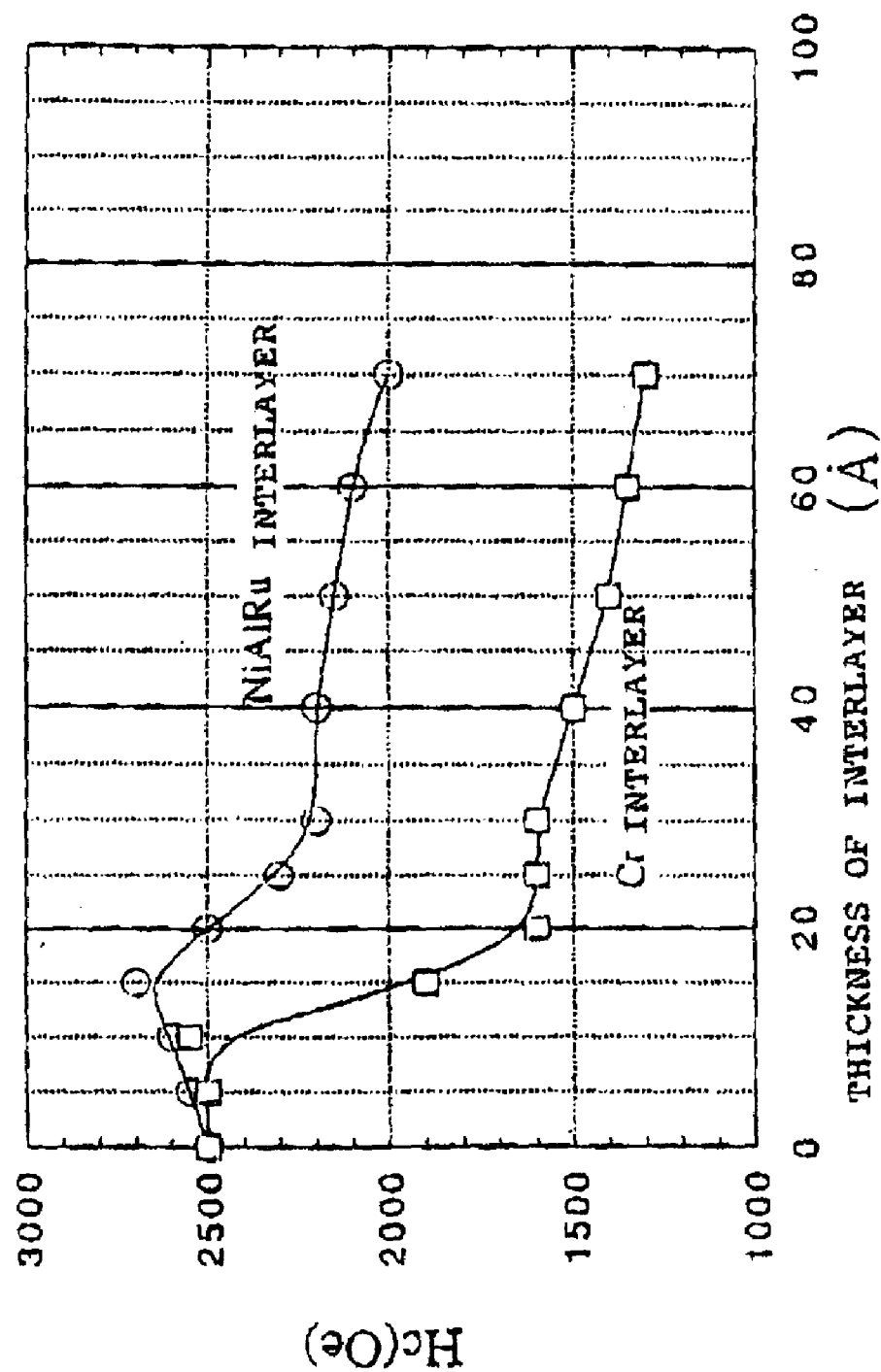
FIG. 2 is a graph showing the relation between the thickness of a NiAlRu interlayer or a Cr interlayer and Hc (coercive force).

FIG. 2 shows the change in the coercive force (Hc) when the thickness of the NiAlRu interlayer of Example 1 or the thickness of the Cr interlayer of Comparative Example 1 was changed within a range of from 0 to 70 Å. It is evident that in the case of the NiAlRu interlayer, the decrease in the coercive force (Hc) is small as compared with the Cr interlayer.

When the magnetic recording film is made to have a structure of Co alloy magnetic layer/NiAlRu interlayer of B2 structure/Co alloy magnetic layer, and the thickness of the NiAlRu interlayer of B2 structure is property selected within a range of from about 3 Å to about 30 Å, more preferably at most 20 Å, a remarkable improvement in S/Nt can be attained, and the value is large as compared with the case of the Cr interlayer. By this selection, the coercive force (Hc) decreases, but the degree of the decrease is small and will not be a trouble in accomplishing a high density recording. In the case of the Cr interlayer, the improvement in S/Nt is small, and the decrease in the coercive force (Hc) is substantial.

The read/write performance with the thickness of the NiAlRu interlayer of 15 Å where the improvement in S/Nt is remarkable, is shown in Table 1. It is evident that with the thickness of the NiAlRu interlayer of 15 Å, not only N media (media noise), S/Nt and S/Nm (signal to media noise ratio), but also the resolution and PW50 (pulse width at 50% of pulse amplitude), are excellent as compared with the case where the Cr interlayer was employed.

TABLE 1

|  | Resolution (%) | PW50 (nsec) | O/W (−dB) | N media (mV$^2$) | S/Nt (dB) | S/Nm (dB) |
| --- | --- | --- | --- | --- | --- | --- |
| Example 1 | 74.13 | 18.41 | 35.6 | 2.53 | 23.6 | 28.6 |
| Comparative Example 1 | 72.46 | 18.85 | 36.8 | 4.17 | 20.1 | 26.3 |

EXAMPLE 2

A sputtering chamber was evacuated to a base pressure of $1 \times 10^{-6}$ Torr, and then film forming was carried out as described below in an Ar atmosphere of 5 mtorr at a substrate temperature of 270° C. without applying a substrate bias.

On a non-ferromagnetic substrate made of aluminosilicate glass, a NiAl seed layer (thickness: 500 Å) was firstly formed by a magnetron sputtering method using a target made of $Ni_{50}Al_{50}$ having B2 structure, and then a Cr layer (thickness: 300 Å) was formed as an underlayer.

Then, on the Cr layer, a first magnetic layer made of $Co_{71}Cr_{17}Ta_4Pt_8$ (the amounts of the respective components being atomic %), was formed in a thickness of 110 Å by a sputtering method. Then, a Ru interlayer was formed thereon in a thickness within a range of 5 Å to 50 Å by means of a Ru target. Further, a second magnetic layer made of $Co_{71}Cr_{17}Ta_4Pt_8$ was formed thereon in a thickness of 110 Å by a similar operation. Then, a carbon type protective layer and a lubricating layer were formed thereon to obtain a test sample of Example 2 of the magnetic recording medium of the present invention. By the X-ray diffraction, the above NiAl seed layer was identified to be NiAl having B2 structure, having a composition of $Ni_{50}Al_{50}$, and the above Ru interlayer was identified to be of a hexagonal closest packed structure.

Further, a magnetic recording medium having the same structure as the test sample of Example 2 except that as the interlayer, an interlayer made of Cr was formed in a thickness within a range of from 5 Å to 50 Å, was prepared in the same manner and used as a test sample of

COMPARATIVE EXAMPLE 2.

Figure 3:
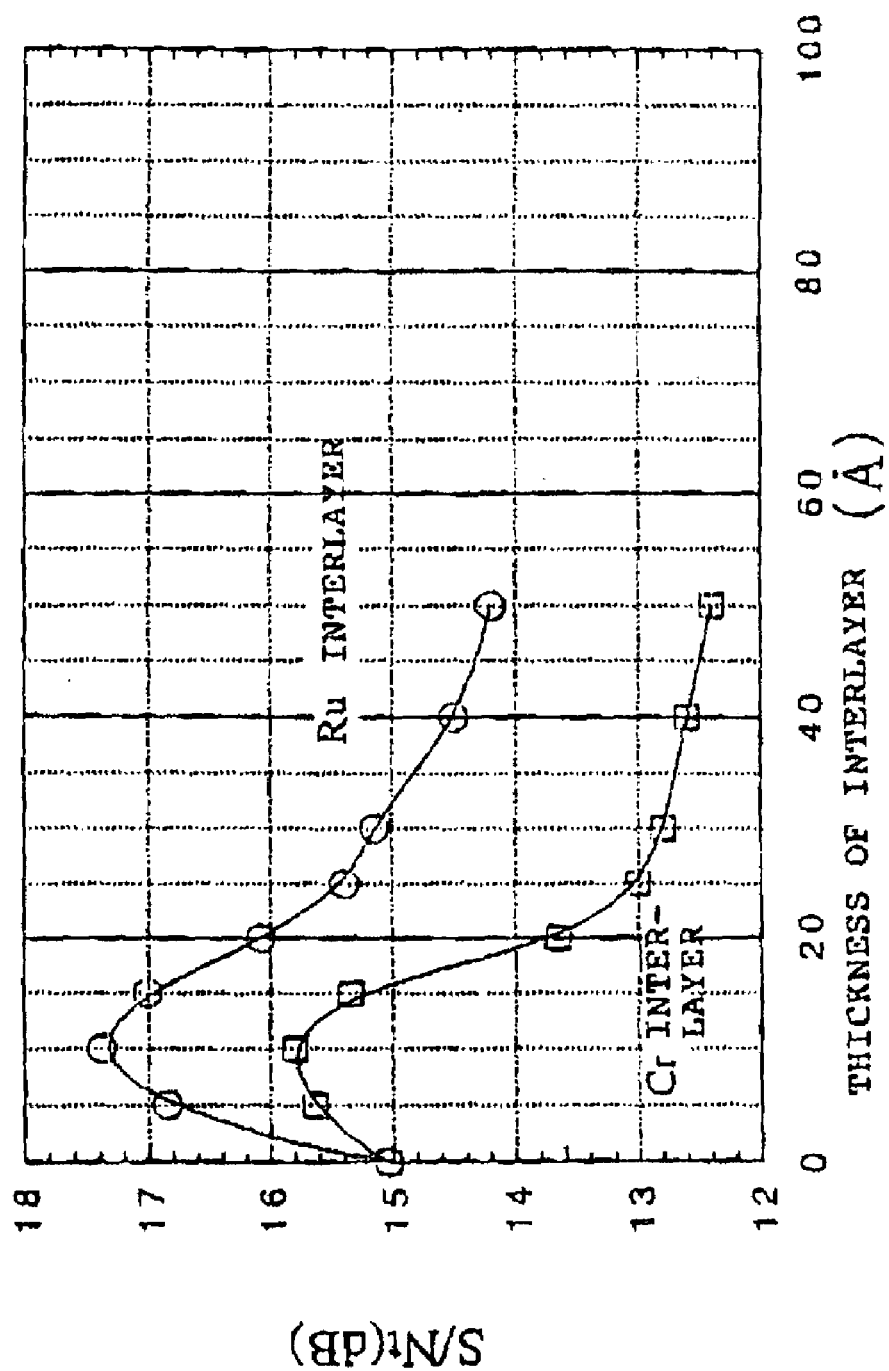
FIG. 3 is a graph shoving the relation between the thickness of a Ru interlayer or a Cr interlayer end S/Nt.

FIG. 3 shows the change in the signal to the total noise ratio (S/Nt) when the thickness of the Ru interlayer of Example 2 or the thickness of the Cr interlayer of Comparative Example 2, was changed within a range of from 0 to 50 Å. It is evident that in the case where the Ru interlayer was used, S/Nt is improved as the thickness increases within a range of from 0 to 30 Å. Further, it is evident that S/Nt is improved also as compared with the case where the Cr interlayer was used.

Figure 4:
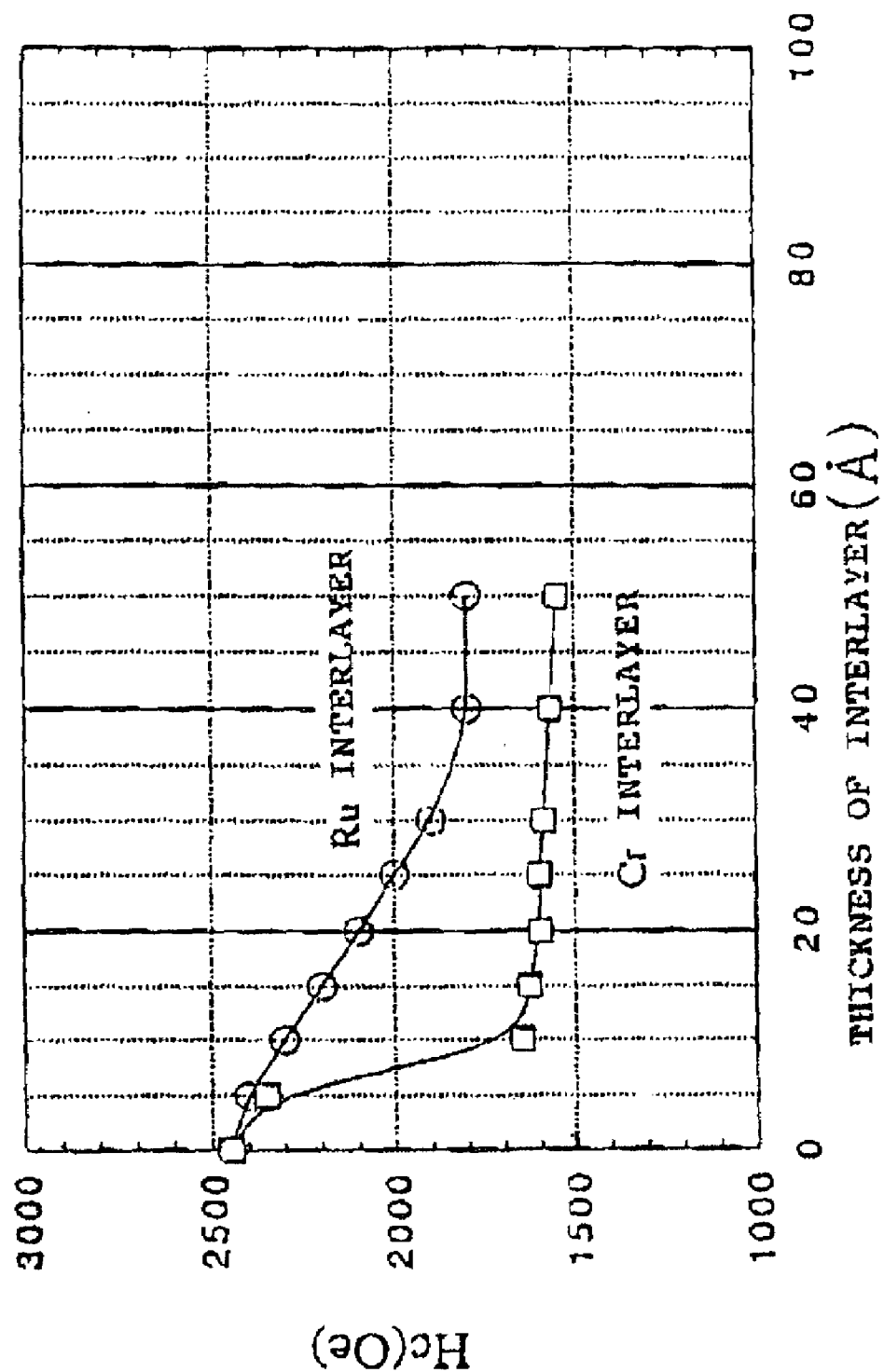
FIG. 4 is a graph showing the relation between the thickness of a Ru interlayer or a Cr interlayer and Hc.

FIG. 4 shows the change in the coercive force (Hc) when the thickness of the Ru interlayer of Example 2 or the thickness of the Cr interlayer of Comparative Example 2, was changed within a range of from 0 to 50 Å. It is evident that in the case of the Ru interlayer, the decrease in the coercive force is small as compared with the case of the Cr interlayer.

When the magnetic recording film is made to have a structure of Co alloy magnetic layer/Ru interlayer/Co alloy magnetic layer, and the thickness of the Ru interlayer is properly selected within a range of from about 3 Å to about 30 Å, preferably at most about 20 Å, remarkable improvement in S/Nt can be attained, and the value is large as compared with the case of the Cr interlayer. By this selection, the coercive force (Hc) will decrease, but the degree of the decrease is small and will not be any trouble in accomplishing a high density recording. In the case of the Cr interlayer, the improvement in S/Nt is small, and the decrease in the coercive force (Hc) is substantial.

The read/write performance with the thickness of the Ru interlayer of 10 Å where the improvement in S/Nt is remarkable, is shown in Table 2. It is evident that with the thickness of the Ru interlayer of 10 Å, not only N media (media noise), S/Nt and S/Nm (signal to media noise ratio), but also the resolution and PW50 (pulsewidth at 50% of pulse amplitude), are excellent as compared with the case where the Cr interlayer was used.

TABLE 2

| | Resolution (%) | PW50 (nsec) | O/W (−dB) | N media (mV$^2$) | S/Nt (dB) | S/Nm (dB) |
|---|---|---|---|---|---|---|
| Example 2 | 73.13 | 24.57 | 38.5 | 23.86 | 17.4 | 19.3 |
| Comparative Example 2 | 70.05 | 26.10 | 41.5 | 24.50 | 15.8 | 17.7 |

EXAMPLE 3

A sputtering chamber was evacuated to a base pressure of 1×10$^{-6}$ Torr, and then film forming was carried out as described below in an Ar atmosphere of 5 mTorr at a substrate temperature of 270° C. without applying a substrate bias.

On a non-ferromagnetic substrate made of aluminosilicate glass, a NiAl seed layer (thickness: 500 Å) was firstly formed by a magnetron sputtering method using a target made of Ni$_{50}$Al$_{50}$ having B2 structure, and then a Cr$_{85}$Mo$_{15}$ layer (thickness: 10 Å) was formed as an underlayer.

Then, on the CrMo layer, a first magnetic layer made of Co$_{68}$Cr$_{20}$Ta$_2$Pt$_{10}$ (the amounts of the respective components being atomic %), was formed in a thickness of 110 Å by a sputtering method. Then, a Ru interlayer was formed thereon in a thickness of 10 Å (i.e. the thickness of the Ru interlayer in which the maximum value of S/Nt was obtained in Example 2) by means of a Ru target. Further, a second magnetic layer made of Co$_{68}$Cr$_{20}$Ta$_2$Pt$_{10}$ was formed thereon in a thickness of 110 Å by a similar operation. Then, a carbon type protective layer and a lubricating layer were formed thereon to obtain a test sample of Example 3 of the magnetic recording medium of the present invention. By the X-ray diffraction, the above NiAl seed layer was identified to be NiAl having B2 structure, having a composition of Ni$_{50}$Al$_{50}$, and the above Ru interlayer was identified to be of a hexagonal closest packed structure.

Further, a magnetic recording medium having the same structures of the substrate, the seed layer and the underlayer as the sample of Example 3 except that as the magnetic recording film on the underlayer, a magnetic recording film (a single layer film) composed of a single magnetic layer made of Co$_{68}$Cr$_{20}$Ta$_2$Pt$_{10}$ was formed in a thickness of 220 Å, was prepared in the same manner and used as a test sample of Comparative Example 3.

In A case where NiAl having B2 structure is employed as the seed layer, when the magnetic recording film is made to have a film structure of Co alloy magnetic layer/Ru interlayer/Co alloy magnetic layer, and the thickness of the Ru interlayer is properly selected within a range of from about 3 Å to about 30 Å, preferably at most about 20 Å, remarkable improvement in S/Nt can be attained. By this selection, the coercive force (Hc) will decrease, but the degree of the decrease is small and will not be any trouble in accomplishing a high density recording.

Hc (Oe) and the read/write performance with the thickness of the Ru interlayer of 10 Å where the improvement in S/Nt is remarkable, are shown in Table 3. It is evident that with the thickness of the Ru interlayer of 10 Å, not only N media (media noise), S/NT and S/Nm (signal to media noise ratio), but also the resolution and PW50 (pulse width at 50% of pulse amplitude), are excellent with the magnetic recording medium having a magnetic recording film of a double layer structure of the present invention, as compared with the case where a magnetic recording film (single layer film) made of single magnetic layer is used.

TABLE 3

| | Resolution (%) | PW50 (nsec) | O/W (−dB) | N media (mV$^2$) | S/Nt (dB) | S/Nm (dB) | Hc (Oe) |
|---|---|---|---|---|---|---|---|
| Example 3 | 62.10 | 18.95 | 37.05 | 16.72 | 23.06 | 26.71 | 2500 |
| Comparative Example 3 | 61.20 | 19.10 | 35.86 | 44.90 | 20.49 | 22.10 | 2600 |

The magnetic recording medium of the present invention has a feature that the noise is remarkably reduced with the structure comprising a non-ferromagnetic substrate and a magnetic recording film formed on the substrate with an underlayer interposed therebetween, wherein the magnetic recording film comprises a plurality of magnetic layers and an interlayer made of a material having a B2 crystal structure or an interlayer made of Ru, disposed between the adjacent magnetic layers.

Further, especially when a non-ferromagnetic substrate made of glass or crystallized glass is employed, the magnetic recording medium of the present invention has an excellent feature that the noise can be remarkably reduced by providing a seed layer made of a material having a B2 crystal structure on the substrate and providing the above-mentioned magnetic recording film of a double layer structure thereon with an underlayer made of Cr or a Cr alloy interposed therebetween.

Furthermore, the magnetic recording medium of the present invention has excellent characteristics also with respect to the resolution and PW50.

What is claimed is:

1. A magnetic recording medium comprising a non-ferromagnetic substrate and a magnetic recording film formed on the substrate with an underlayer interposed therebetween, wherein the magnetic recording film comprises a plurality of Co alloy magnetic layers and an interlayer made of Ru disposed between adjacent magnetic layers, said interlayer having a thickness from 3 Å to less than 10 Å, wherein said magnetic layers are antiferromagnetically coupled to one another across said interlayer.

2. The magnetic recording medium according to claim 1 wherein the underlayer is made of Cr or a Cr alloy.

3. The magnetic recording medium according to claim 1 wherein a seed layer made of a material having a B2 crystal structure is formed on the non-ferromagnetic substrate, and the magnetic recording film is formed on the seed layer with the underlayer interposed therebetween.

4. The magnetic recording medium according to claim 3 wherein the material for the seed layer having the B2 structure is one member selected from the group consisting of NiAl, NiAlRu, NiAlNd, NiAlCr, NiAlPt and NiAlPd.

5. The magnetic recording medium according to claim 1 wherein the magnetic layers are made of a CoCrPt alloy or a CoCrTaPt alloy.

6. The magnetic recording medium of claim 1 wherein said magnetic layers have a thickness on the order of about 110 angstroms.

7. Magnetic recording medium of claim 1 wherein said interlayer increases the signal to noise ratio of said medium compared to the signal to noise ratio if said medium lacked said interlayer.

8. A hard magnetic disk drive comprising the magnetic recording medium of claim 1.

9. Magnetic recording medium comprising:
a non-ferromagnetic substrate;
an underlayer formed over said substrate;
a lower ferromagnetic metallic layer comprising Co formed over said underlayer;
an interlayer comprising Ru formed over said lower ferromagnetic metallic layer, said interlayer having a thickness from 3 Å to less than 10 Å; and
an upper ferromagnetic metallic layer comprising Co formed over said interlayer, wherein said interlayer causes an antiferromagnetic exchange field $H_{ex}$ exerted by the upper ferromagnetic metallic layer on the lower ferromagnetic metallic layer.

10. Structure of claim 9 wherein said substrate comprises an aluminum alloy or glass.

11. Structure of claim 9 wherein said substrate comprises an aluminum alloy covered with NiP and said underlayer comprises CrMo.

12. Structure of claim 9 wherein said upper ferromagnetic metallic layer comprises at least one material selected from the group consisting of Ta, Mo, W, Nb, V, Zr, B and Ti.

13. A hard magnetic disk drive comprising the magnetic recording medium of claim 9.

14. Magnetic recording medium comprising:
a non-ferromagnetic substrate;
an underlayer formed over said substrate;
a lower ferromagnetic metallic layer comprising Co formed over said underlayer;
an interlayer comprising Ru formed over said lower ferromagnetic metallic layer, said interlayer having a thickness from 3 Å to less than 10 Å; and
an upper ferromagnetic metallic layer comprising Co formed over said interlayer, wherein said interlayer causes an antiferromagnetic interface exchange energy density $J_{ex}$.

15. A hard magnetic disk drive comprising the magnetic recording medium of claim 14.

* * * * *